United States Patent [19]

Simpson

[11] Patent Number: 4,469,184

[45] Date of Patent: Sep. 4, 1984

[54] CULTIVATING TOOL WITH TELESCOPICALLY SLIDABLE ANCHOR LEGS

[76] Inventor: Victor J. Simpson, Tally-Ho, Onslow Rd., Burwood Park, Walton-on-Thames, Surrey, England

[21] Appl. No.: 381,907

[22] Filed: May 25, 1982

[51] Int. Cl.³ ............................................. A01B 1/10
[52] U.S. Cl. ...................................................... 172/41
[58] Field of Search ...................... 172/21, 22, 41, 42, 172/43, 352, 111; 254/131, 131.5

[56] References Cited

U.S. PATENT DOCUMENTS

| | | | |
|---|---|---|---|
| 2,532,115 | 11/1950 | McKinney | 254/131.5 |
| 2,718,838 | 9/1955 | Schumacher | 172/42 X |
| 2,991,838 | 7/1961 | Lane | 172/42 X |
| 3,621,920 | 11/1971 | Brown | 172/43 X |

FOREIGN PATENT DOCUMENTS

| | | | |
|---|---|---|---|
| 856537 | 12/1960 | United Kingdom | 172/21 |
| 2052934 | 2/1981 | United Kingdom | 172/41 |
| 0706500 | 1/1980 | U.S.S.R. | 172/111 |

Primary Examiner—Richard T. Stouffer
Assistant Examiner—William H. Honaker
Attorney, Agent, or Firm—Wenderoth, Lind & Ponack

[57] ABSTRACT

A cultivating tool having a U-shaped tubular frame defining a handle which may be gripped by an operator, and two hollow legs which latter house respective anchor legs biassed outwardly by means of a respective coil spring (not shown). A housing mounted between the legs contains a power source such as an electric motor and gearbox (both not shown) controlled by a switch on the handle and driving, via a reduction drive unit, a pair of cultivator rotors. In use, the legs are pushed into the ground against the pressure of the coil springs, a control being provided to ensure that the rotors cannot rotate until pressure has been applied to the anchor legs.

5 Claims, 4 Drawing Figures

CULTIVATING TOOL WITH TELESCOPICALLY SLIDABLE ANCHOR LEGS

This invention relates to a power driven cultivating tool such as may be used in a domestic garden as an alternative to manual tilling of the soil with a garden spade or fork.

According to the invention there is provided a cultivating tool comprising a frame having a handle which in use may be gripped by an operator, drive means mounted on said frame, at least one cultivator blade mounted for rotation by said drive means, at least one anchor leg axially moveably mounted with respect to said frame and spring means acting to bias the or each anchor leg in an outwards direction. In operation, the operator holds the handle and forces the anchor leg or legs against the ground to be cultivated against the pressure of the spring means. Preferably inhibit means are provided to ensure that the cultivator blades cannot rotate until the anchor legs are firmly secured on the ground, thus ensuring safety in operation.

In a preferred embodiment of the invention the frame is such as to define an elongate bore or bores in which the or a respective anchor leg is slidably mounted. In addition said spring means is located within the or each bore and acts between a respective first stop means in the bore and the respective anchor leg in order to bias the anchor leg in a direction out of the bore, further stop means being provided for ensuring that the anchor leg is not pushed out of the bore by the spring means. Preferably, the frame comprises a tubular member in the shape of a U, the bottom of the U defining said handle and the interior of the legs of said U each forming a respective one of said elongate bores in which slides a respective anchor leg in telescopic fashion. The lower end of the or each anchor leg may be conveniently shaped to a spike or such shape as to provide an anchorage in the soil during operation.

The side legs of the U are conveniently linked together to form a rigid construction by cross bracing and a housing incorporating the drive means which in a preferred embodiment would be an electric motor and associated gearbox. Suspended between the two side frames and telescopic anchor leg extensions is a final drive unit driven by the gearbox (if any) and carrying a double ended horizontal rotating final drive shaft. A suitable cultivating rotor is attached to each of the final drive shaft extensions. Each rotor may embody a number of radially disposed blades of a suitable configuration to produce a good cultivated tilth in operation. The function of the telescopic legs is to anchor the cultivator in a fixed position while the operator allows the cultivator to dig down to the required depth. To facilitate this action each leg is spring loaded within the tubular frame by means of said spring means. Clearly, the bias force of the spring means must be sufficient to support the physical weight of the tool. Pressure on the handle by the operator either forces the anchor legs into the soil or retracts them into the tubular frame, against the bias force of the springs means. An operating switch controlling the electric motor may conveniently be located on the tubular handle. Said inhibit means may comprise an over-ride limit switch connected in series with the operating switch in order to prevent the motor from operating until downward pressure is applied to the handle by the operator causing the anchor legs to retract slightly and thus starting the motor through the action of the limit switch operating on an indent in one of the anchor legs.

In order that the invention may be better understood, an embodiment thereof will now be described by way of example only and with reference to the accompanying drawings in which.

Figure 1:
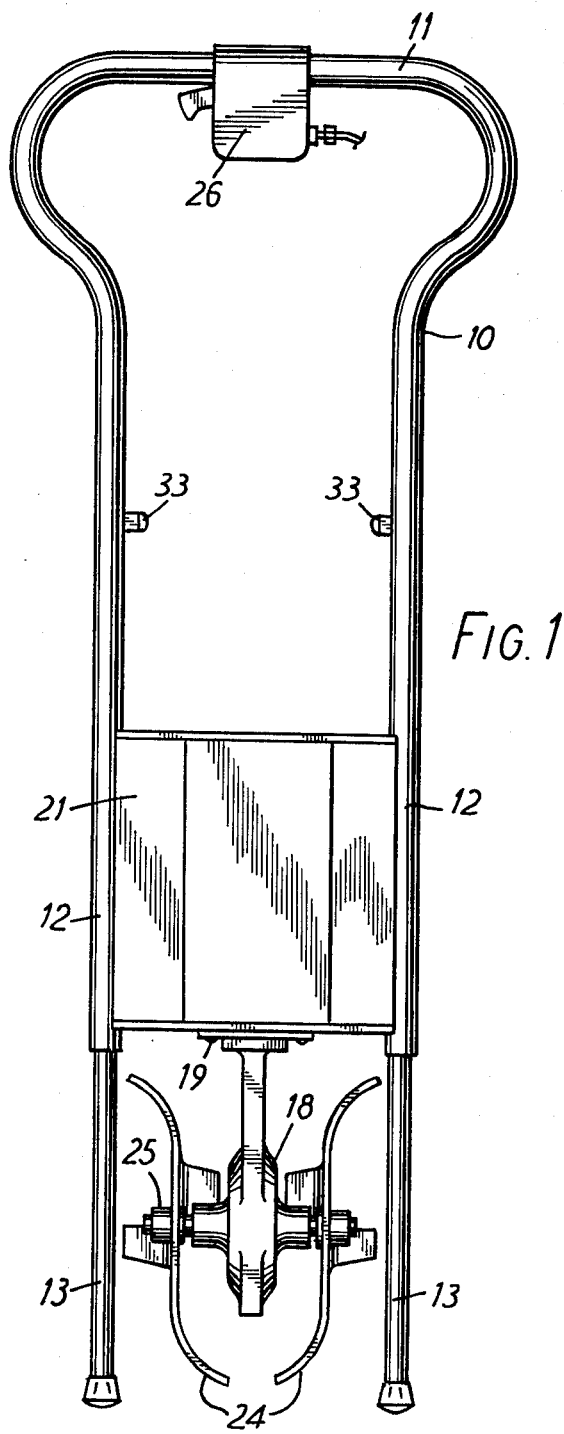
FIG. 1 is a front elevation of an embodiment of a cultivating tool according to the invention.
Figure 2:
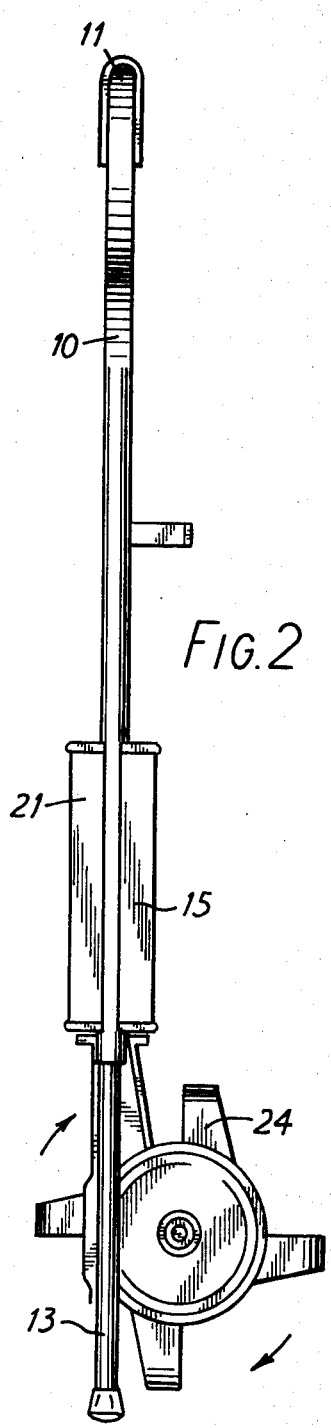
FIG. 2 is a side elevation of the tool shown in FIG. 1.
Figure 3:
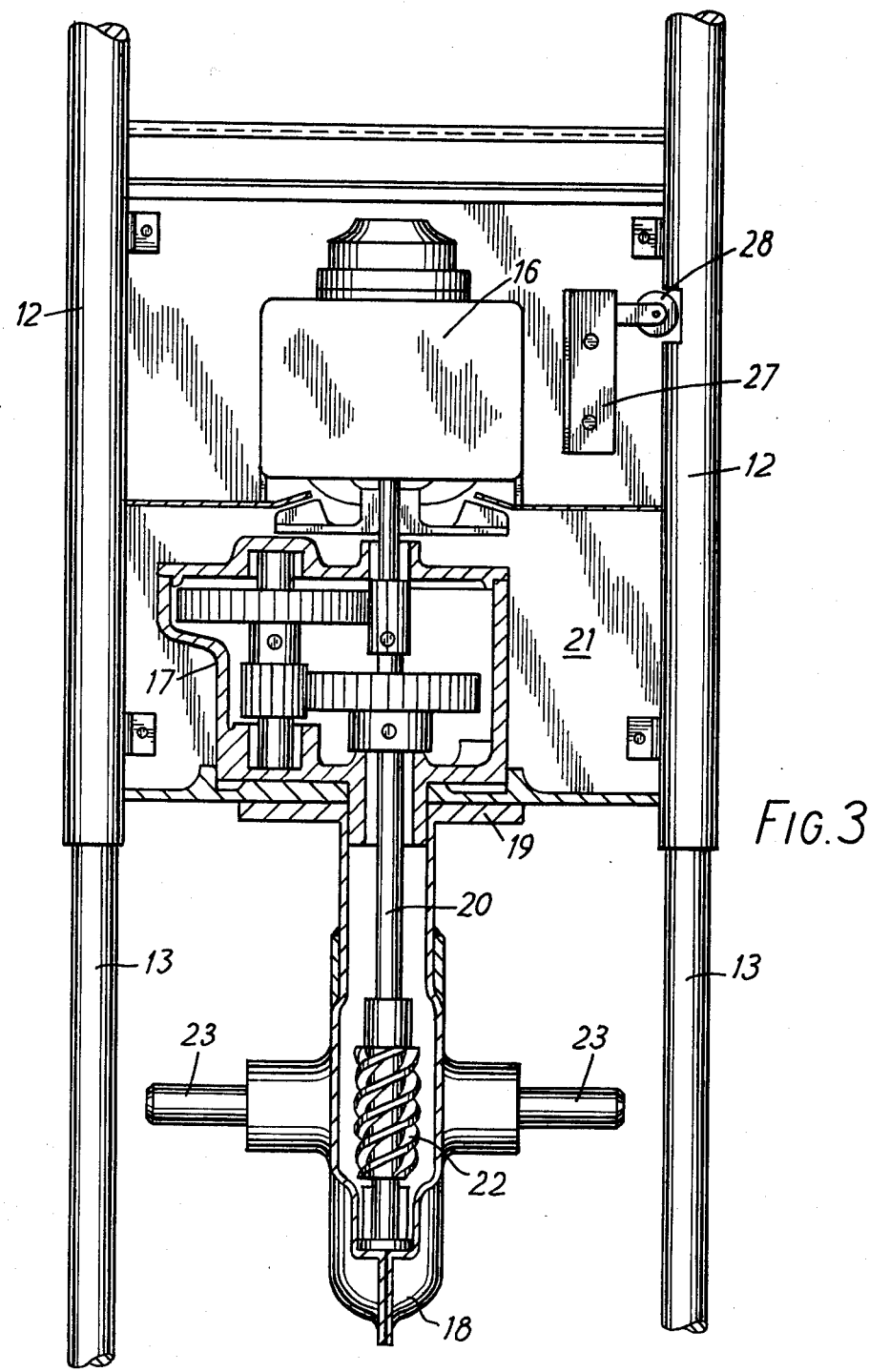
FIG. 3 is a vertical sectioned elevation of the electric motor and gearbox and final drive arrangement in the tool of FIG. 1.

Referring to the drawings, the tool comprises a U-shaped tubular frame 10 formed in such a manner as to provide a widened portion 11 intended to act as an operating handle. The leg 12 of the frame each house a respective telescopic anchor leg 13 and a compression spring 14 (see FIG. 4). Cross braces 40 and 41 extend between the legs 12 and serve to mount an electric motor 16 and primary reduction gearbox 17. A two-part cover consisting of cover members 15 and 21 enclose the motor and gearbox. Power from the gearbox is transmitted to a final drive unit housed within a housing 18 attached to the bottom of the housing 15/21 by means of a flange 19. The final drive unit comprises a worm gear 22 which is mounted on the output shaft 20 of the gearbox and drives a pinion (not shown) mounted on a final drive shaft 23.

The drive shaft 23 extends from both sides of the housing 18 to define two stub axles on which are mounted the cultivator rotors. Each cultivator rotor comprises a boss 25 mounted on a respective stub axle and to which are attached a pluraltiy, for example four, rotor blades 24.

Figure 4:
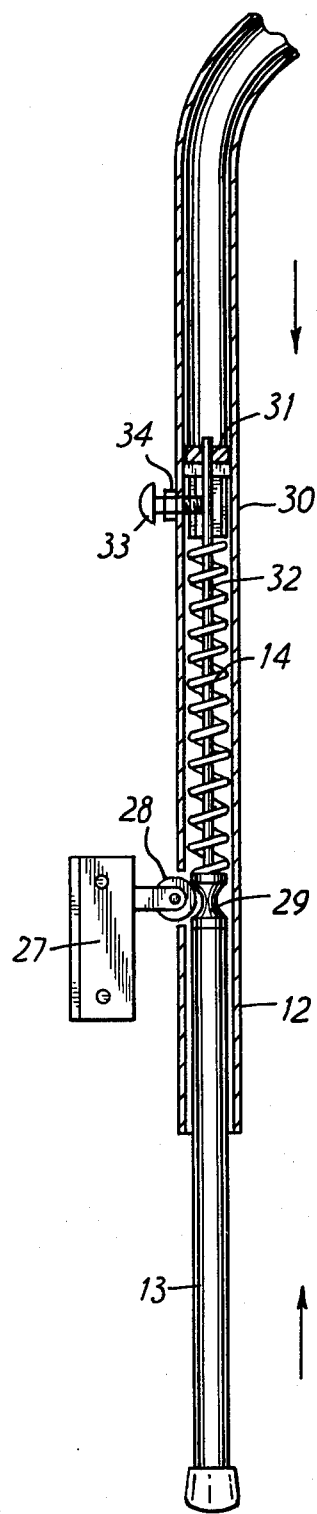
FIG. 4 is a vertical sectioned elevation of one side of the frame with anchor leg and spring in the tool of FIG. 1.

The electric motor 16 is controlled by a hand-operated switch 26 mounted on the handle. A further limit switch 27 may conveniently be introduced in series with the switch 26 to overide the command of the latter. The switch 27 is operated by an extendable arm on the end of which is mounted a roller 28. The normal position of the switch 27 is open, in other-words, even if the switch 26 is operated, power is not transmitted to the motor. This position of switch 27 is shown in FIG. 4. It will be seen that, in this position, the roller 28 protrudes through an aperture in one of the legs 12 and engages a waisted bobbin 29 which is slidably mounted within the leg 12. The bobbin 29 is mounted between the inner end of leg 13 and the corresponding spring 14 and may not be attached to the leg 13. The other end of spring 14 bears against an adjustable stop, as will be explained later. It will be seen that, by the action of the roller 28 on the bobbin 29 in the telescopic leg 13, the motor will only operate when there is downward pressure on the operating handle 11.

In use, the operator stands holding the handle 11 with the tool in front of him in a substantially upright position. Downwards pressure on the handle causes the roller 28 to ride up over the indent defined by the bobbin 29 and at the same time causes the legs 13 to be forced under pressure from spring 14 against the ground. Depending upon the nature of the ground, the leg may or may not penetrate into the surface. The switch 26 may then be operated to supply electrical power to the motor. Rotation of the cultivator rotors 24 in operation produces a force tending to urge the cultivator away from the operator and, were it not for the telescopic anchor legs 13 restraining the appliance in a fixed position, the power driven rotors would propel the cultivator over the surface of the soil. It is the action of the telescopic anchor legs 13 which allows the operator to control the depth of cultivation of the soil. The anchor legs also absorb the reaction forces created by the power driven rotors during the digging operation and render the appliance more comfortable to use with less effort.

The telescopic anchor legs 13 and associated springs 14 are fitted to both legs 13 of the frame 10 in the described embodiment. The depth which the leg 13 retracts into the tubular leg 12 may be controlled by a stop 30. The stop 30 comprises a hollow cylindrical member which is fixed in place within the respective leg 12 by means of a bolt 33 and locking nut 34. The bolt passes through a small hole in the wall of leg 12, and a series of such holes along the length of leg 12 will enable the position of the stop to be adjusted for different conditions of use.

Movement of the leg 13 in the downwards direction is limited by a stop 31 which is attached to a rod 32 which is itself attached to the leg 13.

The above described tool eliminates the need for counter rotating rotors which has hitherto been the accepted art to counter the reaction forces created during the digging operation or alternatively physical effort to guide the cultivator against the reaction forces created in operation.

Although shown as fitted with a drive means in the form of an electric motor, it will be clear that other alternatives, such as a small petrol engine would be possible.

I claim:

1. A cultivating tool comprising:
   a frame means having two substantially parallel elongate bores directed generally downwardly of said frame means and upwardly extending generally parallel portions extending from the upper ends of said bores and a transverse portion on the upper ends of said upwardly extending parallel portions to form a handle on the upper end which in use can be gripped by an operator;
   drive means mounted on said frame means;
   at least one cultivator blade means rotatably mounted on said frame means and connected to said drive means for rotation by said drive means and being of the type tending to drive the end of said frame means which is toward the ground along the ground when said cultivator blade means engages the ground;
   a pair of anchor legs each slidably mounted in telescopic fashion in a respective one of said elongate bores and projecting downwardly out of said bores and having ground engaging means at the outer end thereof for engaging the ground during operation of said cultivating tool for blocking movement of said cultivating tool along the ground during such operation;
   spring means and first stop means positioned within each bore, said spring means acting between said first stop means and the respective anchor leg biasing the anchor leg in a direction out of the bore for absorbing reaction forces generated by the blade means driven by said drive means and automatically adjusting in length as said blade means penetrate the ground; and
   further stop means for ensuring that the anchor legs are not pushed out of their respective bores by the spring means.

2. A cultivating tool as claimed in claim 1 wherein said frame means further comprises at least one cross brace extending between said parallel elongate portions and carrying said drive means and cultivator blade means.

3. A cultivating tool as claimed in claims 1 or 2 wherein the axis of rotation of said cultivator blade means is parallel to the plane containing said parallel elongate portions and is orthogonal to said parallel elongate portions.

4. A cultivating tool according to claim 1 or 2 further comprising an inhibit mechanism operably associated with at least one of said anchor legs for preventing operation of the tool until that anchor leg is moved a certain distance relative to said frame against the action of said spring means.

5. A cultivating tool according to claim 1 or 2 and further comprising an inhibit mechanism operably associated with at least one of said anchor legs for preventing operation of the tool until that anchor leg is moved a certain distance relative to said frame against the action of said spring means, and wherein said inhibit mechanism comprises detent means mounted for movement with said anchor leg, and an electrical switch connected to said drive means and operable to de-energize said drive means, and a switch operating member normally biased into said detent means to a position in which the drive means is de-energized and retractable to a position to operate said switch to thus allow the drive means to operate when the anchor leg is moved.

* * * * *